United States Patent [19]

Horiguchi et al.

[11] Patent Number: 4,720,413

[45] Date of Patent: Jan. 19, 1988

[54] MAGNETIC RECORDING MEDIUM HAVING A BACK COAT LAYER

[75] Inventors: Akira Horiguchi; Isao Sasaki; Hirokazu Moriizumi, all of Mito, Japan

[73] Assignee: Victor Company of Japan, Ltd., Japan

[21] Appl. No.: 892,382

[22] Filed: Jul. 21, 1986

[30] Foreign Application Priority Data

Jul. 22, 1985 [JP] Japan .............................. 60-160262
Jul. 22, 1985 [JP] Japan .............................. 60-160263
Jul. 29, 1985 [JP] Japan .............................. 60-165839

[51] Int. Cl.$^4$ ............................................. G11B 5/70
[52] U.S. Cl. .................................... 428/141; 428/143; 428/323; 428/694; 428/900
[58] Field of Search ............... 428/694, 900, 323, 141, 428/143; 427/131

[56] References Cited

U.S. PATENT DOCUMENTS

| | | | |
|---|---|---|---|
| 4,592,952 | 6/1986 | Miyoshi et al. | 427/131 |
| 4,595,631 | 6/1986 | Matsumoto | 428/694 |
| 4,618,535 | 10/1986 | Nishimatsu et al. | 427/131 |

*Primary Examiner*—Paul J. Thibodeau
*Attorney, Agent, or Firm*—Lowe, Price, Leblanc, Becker & Shur

[57] ABSTRACT

A magnetic recording medium which comprises a non-magnetic support, a magnetic recording layer formed on one side of the support, and a back coat layer formed on the other side. The back coat layer is made of a dispersion, in a binder resin, of non-magnetic particles on which there is adsorbed carbon black having an average size not larger than 100 millimicrons and a specific surface area not less than 30 m$^2$/g.

5 Claims, No Drawings

MAGNETIC RECORDING MEDIUM HAVING A BACK COAT LAYER

BACKGROUND OF THE INVENTION

1. Field of the Invention

This invention relates to magnetic recording and more particularly, to magnetic recording media in the form of tapes and disks for video, audio and computer services.

2. Description of the Prior Art

Magnetic recording mediums such as video tapes have been extensively studied and developed and thus, the electromagnetic characteristics of the mediums have been drastically improved.

As is known in the art, the electromagnetic characteristics have generally a close relation with the smoothness of a support for the magnetic recording medium. Accordingly, it is usual to use a smooth support in order to improve the electromagnetic characteristics.

However, a magnetic recording medium having a smooth base film on which a magnetic recording layer is formed is disadvantageous in that it becomes poor in wear resistance and poor in travelling performance.

In order to overcome the above disadvantage, there have been proposed magnetic recording media which have a back coat layer on a side of a base film opposite to the side on which the magnetic recording layer is formed. The back coat layer generally contains carbon black and non-magnetic particles dispersed in a resin binder. Carbon black is able to prevent the medium from being electrostatically charged. As a consequence, the medium is prevented from deposition of dust thereon and from disturbance in winding. The non-magnetic particles can improve the wear resistance and durability of the medium.

However, we found that the back coat layer comprising carbon black and non-magnetic particles could not work as desired and did not thus improve the characteristics of the medium satisfactorily.

For instance, carbon black has relatively poor dispersability as is known in the art. If carbon black is not adequately dispersed in a coating paint, it tends to agglomerate into lumps. When the paint containing the agglomerates is coated on a support, the resulting back coat layer has very poor surface properties. The magnetic tape having the back coat layer is disadvantageous in that when the tape is rolled, the back coat layer is partially transferred to the surface of the magnetic layer, thus bringing about a lowering of electromagnetic characteristics.

Moreover, non-magnetic particles ordinarily used in combination with carbon black are particles of alumina or chromium oxide. These particles are so hard that members of a magnetic recording and reproducing apparatus which are in contact with the back coat layer in travelling operations are liable to be frictionally abraded with the particles in the back coat layer. This will cause the travelling performance to lower.

SUMMARY OF THE INVENTION

It is accordingly an object of the invention to provide a magnetic recording medium which has a back coat layer containing carbon black-adsorbing non-magnetic particles whereby electromagnetic characteristics are improved with a small surface electric resistance.

It is another object of the invention to provide a magnetic recording medium which has an improved back coat layer whereby a coefficient of dynamic friction becomes small and a good travelling performance is ensured without causing defects on guide pins and the like members of a recording and reproducing apparatus.

It is a further object of the invention to provide a magnetic recording medium having a back coat layer in which because carbon black is adsorbed on non-magnetic particles, the particles are more readily dispersed in a solvent than carbon black alone and thus the back coat layer can be formed more efficiently.

The magnetic recording medium of the invention is of the type which comprises a non-magnetic support, a magnetic recording layer formed on one side of the support, and a back coat layer formed on the other side. The invention is characterized in that the back coat layer is made of a dispersion of carbon black-adsorbing non-magnetic particles in a resin binder. The carbon black should have an average particle size not larger than 100 millimicrometers (m$\mu$) and a specific surface area of not less than 30 m$^2$/g and the non-magnetic particles should have a Mohs hardness of from 2.5 to 10, preferably from 6 to 10. Moreover, the centerline average roughness of the back coat layer should preferably be in the range of from 0.005 to 0.1 micrometer.

DETAILED DESCRIPTION AND EMBODIMENTS OF THE INVENTION

Carbon black, which is adsorbed on non-magnetic particles, may be any of the commercially available carbon blacks provided that they have an average particle size not larger than 100 millimicrometers and a specific surface area of not less than 30 m$^2$/g. This type of carbon black may be commercially available, for example, from Nippon EC Co., Ltd. under the designation of Ketjen Black.

The non-magnetic particles should have a Mohs hardness of from 2.5 to 10, preferably from 6 to 10. Preferably, the particles have an average size of from 0.01 to 2 micrometers. Examples of the non-magnetic materials useful in the present invention include calcium carbonate, barium sulfate, calcium fluoride, titanium monoxide, titanium nitride, alumina, titanium dioxide, chromium oxide, and the like. Of these, alumina, titanium dioxide, chromium oxide, titanium monoxide and titanium nitride, which have a Mohs hardness of 6 or over, are preferred. This is because if non-magnetic materials having a Mohs hardness below 6 are used, the resulting back coat layer may be, more or less, liable to suffer defects on contact with guide pins and the like.

If, however, non-magnetic materials having a Mohs hardness over 6 are used without adsorption with carbon black, guide pins and the like which are in contact with the medium are frictionally abraded because of the high hardness of the materials contained in the back coat layer. In the practice of the invention, since carbon black is adsorbed on the non-magnetic materials, the hardness of the individual particles is reduced to an appropriate degree, so that frictional abrasion of guide pins with the medium is significantly suppressed. In addition, carbon black adsorbed on the non-magnetic particles serves as a kind of solid lubricant, thus improving the travelling performance.

In order to adsorb carbon black on non-magnetic particles, it is sufficient that a carbon black powder having a predetermined size and an intended metal oxide powder are mixed under high temperature and high pressure conditions. Carbon black should preferably be adsorbed in amounts from 0.5 to 100 wt %, more preferably not less than about 10 wt %, based on the non-magnetic particles.

The carbon black-bearing particles are dispersed in a resin binder at a ratio by weight of 1/10 to 10/1. The resin binders may be synthetic resins and semi-synthetic resins. Examples of the synthetic resins include thermoplastic resins such as vinyl chloride resins, vinyl chloride-vinyl acetate copolymers, vinyl chloride-ethylene copolymers, vinyl chloride-propylene copolymers, vinyl chloride-alkyl acrylate copolymers, acrylonitrile-styrene copolymers, vinyl chloride-vinylidene chloride copolymers, acrylic ester-vinylidene chloride copolymers, methacrylic ester-vinylidene chloride copolymers, urethane elastomers, vinyl chloride-vinyl acetate-vinyl alcohol terpolymers, and other synthetic rubber resins. Examples of the thermosetting resins include phenolic resins, epoxy resins, alkyd resins, silicone resins, urea-formaldehyde resins, mixtures of isocyanates and polyols, and the like. Examples of the semi-synthetic resins include cellulose derivatives such as nitro cellulose, cellulose acetate and the like. These resins may be used singly or in combination.

The carbon black-adsorbing particles are dispersed in resin binders dissolved in solvents such as alcohols, aromatic compounds, ketones, and the like. The dispersion is applied onto a support and cured to form a back coat layer generally in a dry thickness of from 0.3 to 4 micrometers. In the practice of the invention, the centerline surface roughness of the layer should preferably be in the range of 0.005 to 0.1 micrometer. Within this range, the medium has a significantly improved coefficient of dynamic friction and also significantly improved electromagnetic characteristics.

The back coat layer may further comprise dispersants, surface active agents, stabilizers and the like, if desired, in amounts not impeding the effect of the carbon black-adsorbing particles.

As described before, a magnetic recording layer is formed on a side of a support opposite to the side on which the back coat layer is formed. The magnetic recording layer is not critical and may be any known layers containing ferromagnetic particles dispersed in resin binders. Accordingly, the recording layer is not discussed herein but is particularly described in examples appearing hereinafter.

The support may be in the form of films, foils, sheets, and the like and is made of a variety of materials such as polyesters, polyolefins, cellulose derivatives, metals, glasses, ceramics and the like.

The present invention is more particularly described by way of examples.

EXAMPLE 1

100 parts by weight of Co-containing gamma-$Fe_2O_3$, 1 part by weight of lecithin, 15 parts by weight of vinyl chloride-vinyl acetate-vinyl alcohol copolymer, 5 parts by weight of polyurethane elastomer and 320 parts by weight of a mixed solvent of methyl ethyl ketone and toluene were sufficiently mixed and dispersed in a sand mill, to which 5 parts by weight of a polyisocyanate curing agent was added to obtain a magnetic paint. The magnetic paint was applied onto one side of a 14.5 micrometer thick polyester support, followed by calendering to form an about 5 micrometer thick magnetic layer on the polyester film support.

10 parts by weight of carbon black-adsorbing $CaCO_3$, in which carbon black having an average size of 15 millimicrometers and a specific surface area of 300 $m^2/g$ had been adsorbed in an amount of 30 wt % of $CaCO_3$ on the surfaces of $CaCO_3$ having an average size of 0.2 micrometers and a Mohs hardness of 3, 5 parts by weight of nitro cellulose, 10 parts by weight of polyurethane elastomer, 70 parts by weight of methyl ethyl ketone, and 30 parts by weight of cyclohexanone were sufficiently mixed and dispersed in a sand mill. This paint was applied on the polyester film support on the other side and dried to form an about 1 micrometer thick resin layer containing carbon black-adsorbing $CaCO_3$.

Thereafter, the film was allowed to stand at 40° C. for 48 hours to effect the curing reaction and was then slit into magnetic tapes for a video tape recorder.

EXAMPLE 2

The general procedure of Example 1 was repeated except that carbon black-adsorbing $BaSO_4$ was used in which $BaSO_4$ particles had an average size of 0.3 micrometers and a Mohs hardness of 3 to 3.5 and the amount of adsorbed carbon black was 30 wt % based on the $BaSO_4$, thereby obtaining magnetic tapes.

EXAMPLE 3

The general procedure of Example 1 was repeated except that carbon black-adsorbing $CaF_2$ was used in which $CaF_2$ particles had an average size of 0.3 micrometers and a Mohs hardness of 4 and the amount of adsorbed carbon black was 30 wt % based on the $BaSO_4$, thereby obtaining magnetic tapes.

COMPARATIVE EXAMPLE 1

The general procedure of Example 1 was repeated except that the resin layer containing carbon black-adsorbing $CaCO_3$ was not provided, thereby obtaining magnetic tapes.

COMPARATIVE EXAMPLE 2

The general procedure of Example 1 was repeated except that 5 parts by weight of carbon black and 5 parts by weight of $CaCO_3$ were separately used instead of 10 parts by weight of the carbon black-adsorbing $CaCO_3$, thereby obtaining magnetic tapes.

COMPARATIVE EXAMPLE 3

The general procedure of Example 1 was repeated except that $CaCO_3$ was used instead of the carbon black-adsorbing $CaCO_3$, thereby obtaining magnetic tapes.

The magnetic tapes obtained in the above examples and comparative examples were subjected to measurements of a luminance signal-to-noise ratio (Y-S/N), a chrominance signal-to-noise ratio (C-S/N), a surface electric resistance of the resin layer and coefficients of dynamic friction before and after 500 travelling cycles and were also checked with respect to a degree of defects of contacting pins and the number of dropouts after 500 travelling cycles.

The Y-S/N and C-S/N were determined by setting each tape in a video tape recorder HR-2200, made by Victor Company of Japan, Limited and measuring the S/N characteristics while recording and reproducing.

The coefficient of dynamic friction means a coefficient of friction between the resin layer and a chromium-plated pin in a travelling path.

The degree of defects was visually observed by repeatedly travelling each tape by the use of a video tape recorder BR-6400, made by Victor Company of Japan, Limited. The mark "o" indicates no defects and "x" indicates a degree of defects.

The dropout defects are determined by counting the number of reproduction output signals which lower by not less than 20 dB over 15 microseconds.

The results are shown in Table 1 below.

TABLE 1

|  | Y-S/N (dB) | C-S/N (dB) | Surface Electric Resistance (ohms/sq.) | Coefficient of Dynamic Friction | | Degree of Defects on Guide Pin | Dropouts (Number/ Minute) |
|---|---|---|---|---|---|---|---|
|  |  |  |  | Before Traveling Cycles | After 500 Traveling Cycles |  |  |
| Example: |  |  |  |  |  |  |  |
| 1 | +4.4 | +4.6 | $3 \times 10^7$ | 0.18 | 0.19 | o | 5 |
| 2 | +4.3 | +4.4 | $2 \times 10^7$ | 0.18 | 0.18 | o | 8 |
| 3 | +4.2 | +4.3 | $5 \times 10^7$ | 0.17 | 0.19 | o | 3 |
| Comparative Example: |  |  |  |  |  |  |  |
| 1 | +4.1 | +4.4 | $1 \times 10^{13}$ | 0.16 | 0.55 | o | 37 |
| 2 | +0.8 | +0.9 | $8 \times 10^6$ | 0.18 | 0.36 | o | 63 |
| 3 | +3.9 | +4.3 | $1 \times 10^{13}$ | 0.17 | 0.19 | o | 32 |

The results of the table reveal that the medium of Comparative Example 1 having no back coat layer is substantially equal in Y-S/N and C-S/N characteristics to the media of the present invention, but has so large a surface resistance that it is liable to be electrically charged. Accordingly, when travelled repeatedly, the medium has an increasing coefficient of dynamic friction, resulting in a poor travelling performance. In addition, the medium involves a number of dropout defects.

With the medium of Comparative Example 2 in which carbon black and non-magnetic $CaCO_3$ having a Mohs hardness of about 3 are separately added to the back coat layer, all the characteristics tested are significantly inferior to the characteristics of the media of the present invention. Moreover, with the medium of Comparative Example 3 in which carbon black is not contained in the back coat layer, the surface electric resistance is very high, so that the medium is very apt to be electrically charged and suffers a number of dropout defects.

In contrast, the media of the present invention have good characteristics including the Y-S/N, C-S/N, surface electric resistance, travelling performance, defects of the pin and dropout defects.

EXAMPLE 4

The general procedure of Example 1 was repeated except that alpha-$Al_2O_3$ having an average size of 0.3 micrometers and having a Mohs hardness of 9 was used instead of $CaCO_3$, in which carbon black had been deposited or adsorbed, thereby obtaining magnetic tapes.

EXAMPLE 5

The general procedure of Example 4 was repeated except that carbon black-adsorbing $TiO_2$ was used in which $TiO_2$ particles had an average size of 0.25 micrometers and a Mohs hardness of 6 to 7, thereby obtaining magnetic tapes.

EXAMPLE 6

The general procedure of Example 4 was repeated except that carbon black-adsorbing $Cr_2O_3$ was used in which $Cr_2O_3$ particles had an average size of 0.4 micrometers and a Mohs hardness of 9, thereby obtaining magnetic tapes.

COMPARATIVE EXAMPLE 4

The general procedure of Example 4 was repeated except that 5 parts by weight of carbon black and 5 parts by weight of alpha-$Al_2O_3$ were used instead of 10 parts by weight of carbon black-adsorbing alpha-$Al_2O_3$, thereby obtaining magnetic tapes.

COMPARATIVE EXAMPLE 5

The general procedure of Example 4 was repeated except that alpha-$Al_2O_3$ was used instead of carbon black-adsorbing alpha-$Al_2O_3$, thereby obtaining magnetic tapes.

The magnetic tapes of Examples 4 to 6 and Comparative Examples 4 and 5 were subjected to tests in the same manner as in the foregoing examples. The results are shown in Table 2 below.

TABLE 2

|  | Y-S/N (dB) | C-S/N (dB) | Surface Electric Resistance (ohms/sq.) | Coefficient of Dynamic Friction | | Degree of Defects on Guide Pin | Dropouts (Number/ Minute) |
|---|---|---|---|---|---|---|---|
|  |  |  |  | Before Traveling Cycles | After 500 Traveling Cycles |  |  |
| Example: |  |  |  |  |  |  |  |
| 4 | +4.0 | +4.4 | $2 \times 10^7$ | 0.17 | 0.17 | o | 6 |
| 5 | +4.2 | +4.5 | $4 \times 10^7$ | 0.16 | 0.16 | o | 3 |
| 6 | +3.7 | +4.2 | $5 \times 10^7$ | 0.17 | 0.18 | o | 2 |
| Comparative Example: |  |  |  |  |  |  |  |
| 4 | +1.3 | +0.7 | $9 \times 10^6$ | 0.18 | 0.37 | o | 69 |
| 5 | +3.8 | +4.5 | $2 \times 10^{13}$ | 0.16 | 0.20 | o | 40 |

From the above results, it will be seen that with the medium having a back coat layer in which carbon black and alpha-alumina are separately contained without carbon black being adsorbed on alpha-alumina, the magnetic characteristics and the coefficient of dynamic friction are significantly poorer than the media of the invention, with a greater number of dropout defects involved. With the medium of Comparative Example 5 in which alpha-alumina is contained in the back coat layer, although the magnetic characteristics are relatively high, the surface electric resistance is undesirably so high that the medium is more liable to be electrostatically charged, with a number of dropout defects involved.

In contrast, the media of the invention have better characteristics. In addition, upon comparison between Examples 1 to 3 and Examples 4 to 6, the coefficient of dynamic friction is better in the media of Examples 4 to 6 than in the media of Examples 1 to 3. In addition, the media of Examples 4 to 6 are slightly better in dropout defects than the media of Examples 1 to 3 and are less liable to suffer defects of the back coat layer. Thus, the non-magnetic materials should preferably have a Mohs hardness of 6 or higher.

EXAMPLE 7

100 parts by weight of Co-deposited gamma-$Fe_2O_3$, 1 part by weight of lecithin, 10 parts by weight of nitro cellulose, 10 parts by weight of polyurethane elastomer, 5 parts by weight of TiO, and 270 parts by weight of a mixed solvent of toluene, methyl ethyl ketone and cyclohexanone were mixed and dispersed in a ball mill to obtain a magnetic paint. This paint was applied onto one side of a polyethylene terephthalate base film and treated in the same manner as in Example 1.

10 parts by weight of carbon black-depositing $Al_2O_3$ in which the carbon black had a specific surface area of 30 $m^2/g$ and $Al_2O_3$ had an average size of 0.3 micrometers and a Mohs hardness of 9, 5 parts by weight of nitro cellulose, 5 parts by weight of polyurethane and 40 parts by weight of methyl isobutyl ketone were mixed and dispersed in a sand mill. The resulting paint was applied on the other side of the base film in a thickness of 1 micrometer and dried.

The film was allowed to stand at 40° C. for 48 hours for curing and slit into ½ inch wide magnetic tapes.

EXAMPLE 8

The general procedure of Example 7 was repeated except that carbon black used had a specific surface area of 100 $m^2/g$ thereby obtaining magnetic tapes.

COMPARATIVE EXAMPLE 6

The general procedure of Example 7 was repeated except that carbon black used had a specific surface area of 20 $m^2/g$ thereby obtaining magnetic tapes.

The tapes obtained in Examples 7, 8 and Comparative Example 6 were subjected to similar tests as in the foregoing examples. The results are shown in Table 3 below.

TABLE 3

| | | Coefficient Dynamic Friction | | Degree of Defects | |
| --- | --- | --- | --- | --- | --- |
| | C-S/N | Before Traveling Cycles | After 500 Traveling Cycles | Back Coat Layer | Guide Pin |
| Example: | | | | | |
| 7 | 2.8 | 0.18 | 0.18 | no | no |
| 8 | 2.8 | 0.16 | 0.17 | no | no |
| Comparative Example: | | | | | |
| 6 | 2.8 | 0.16 | 0.32 | slight | slight |

As will be apparent from the above, when the specific surface area of carbon black is less than 30 $m^2/g$, the coefficient of dynamic friction increases after repetition of the travelling operations. In addition, only slight defects on the back coat layer and the guide pin are observed.

What is claimed is:

1. In a magnetic recording medium which comprises a non-magnetic support, a magnetic recording layer formed on one side of the support, and a back coat layer formed on the other side of the support, the improvement in that said back coat layer is made of a dispersion, in a resin binder, of non-magnetic particles which have a Mohs hardness of from 2.5 to 10 and which have adsorbed thereon carbon black having an average particle size not larger than 100 millimicrometers and a specific surface area of not less than 30 $m^2/g$.

2. A magentic recording medium according to claim 1, wherein the Mohs hardness is in the range of from 6 to 10.

3. A magnetic recording medium according to claim 1, wherein the back coat layer is made of the carbon black-adsorbing non-magnetic particles and the resin binder in a ratio by weight of 1/10 to 10/1.

4. A magnetic recording medium according to claim 1, wherein said non-magnetic particles have an average size of from 0.01 to 2 micrometers.

5. A magnetic recording medium according to claim 1, wherein the back coat layer has a centerline average roughness of from 0.005 to 0.1 micrometer.

* * * * *